United States Patent [19]

Gardner et al.

[11] 4,035,868
[45] July 19, 1977

[54] MEANS FOR HANDLING HIDES DURING AND AFTER HIDE-PULLING OPERATION

[76] Inventors: Patrick J. Gardner, 419 E. Maple; Hugh T. Myers, Sr., 111 Bonita, both of Ottumwa, Iowa 52501

[21] Appl. No.: 614,140

[22] Filed: Sept. 17, 1975

[51] Int. Cl.² .............................................. A22B 5/16
[52] U.S. Cl. .......................................... 17/21; 17/50
[58] Field of Search ................ 17/21, 50, 24, 62, 44.2, 17/44.3, 44; 99/584, 585, 587; 254/78; 24/68 CT, 68 CD

[56] References Cited

U.S. PATENT DOCUMENTS

| | | | |
|---|---|---|---|
| 733,989 | 7/1903 | Morris | 17/44 |
| 3,129,454 | 4/1964 | Johnson | 17/21 |
| 3,403,421 | 10/1968 | Bedford | 17/21 |
| 3,404,431 | 10/1968 | Knauss | 17/21 |
| 3,537,130 | 11/1970 | McDonnell | 17/50 |
| 3,541,637 | 11/1970 | Robison | 17/21 |
| 3,737,949 | 6/1973 | Davis | 17/21 |

OTHER PUBLICATIONS

*The National Provisioner,* Ultima 8, vol. 72, No. 17, Apr. 26, 1975.

*Primary Examiner*—Louis G. Mancene
*Assistant Examiner*—Paul J. Hirsch
*Attorney, Agent, or Firm*—J. Warren Kinney, Jr.

[57] ABSTRACT

A pair of chains are secured in spaced relationship to an endless conveyor from which they depend for controlling the closing and opening of a slip loop defined by one of the chains. A flap of hide is retained in the slip loop during and after a hide pulling operation until the pulled hide has been fully elevated to a predetermined position, at which time it is released and dropped at a location adjacent but spaced from the locus of the hide-pulling operation. The closing and opening of the slip loop is a function of the relationship of the connection of the chains with the endless conveyor as it changes direction during its travel along a predetermined path.

20 Claims, 7 Drawing Figures

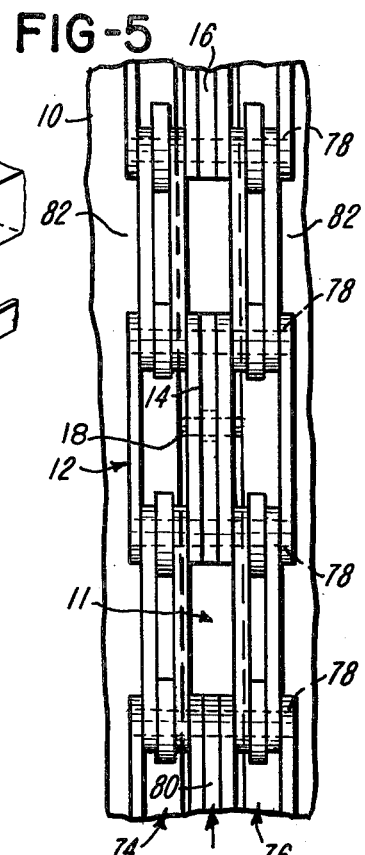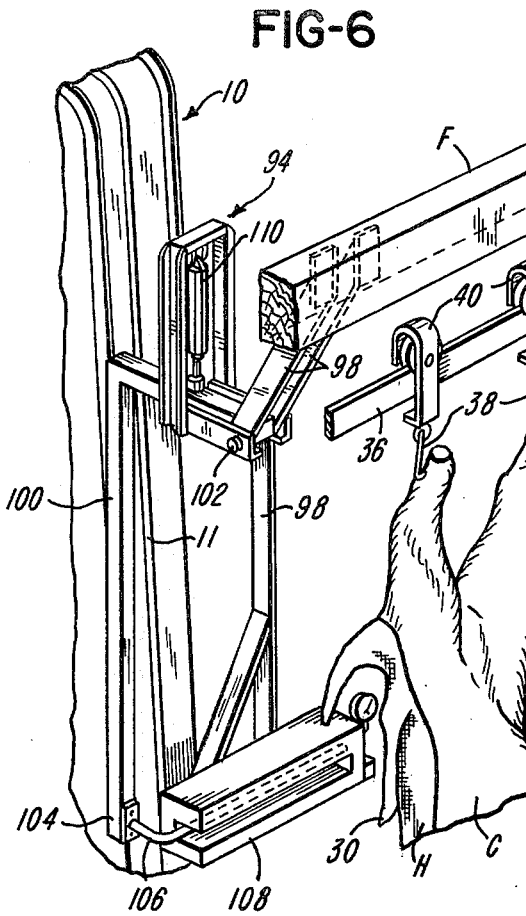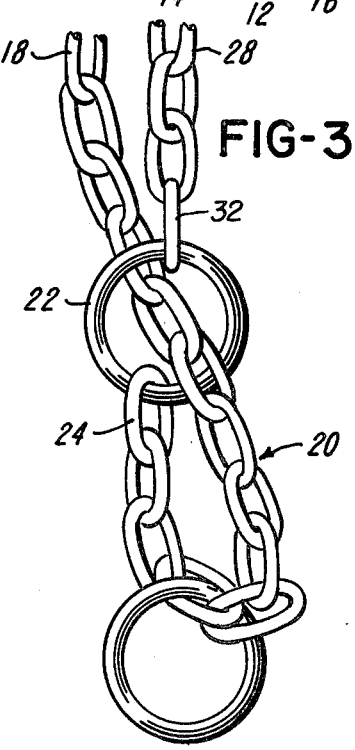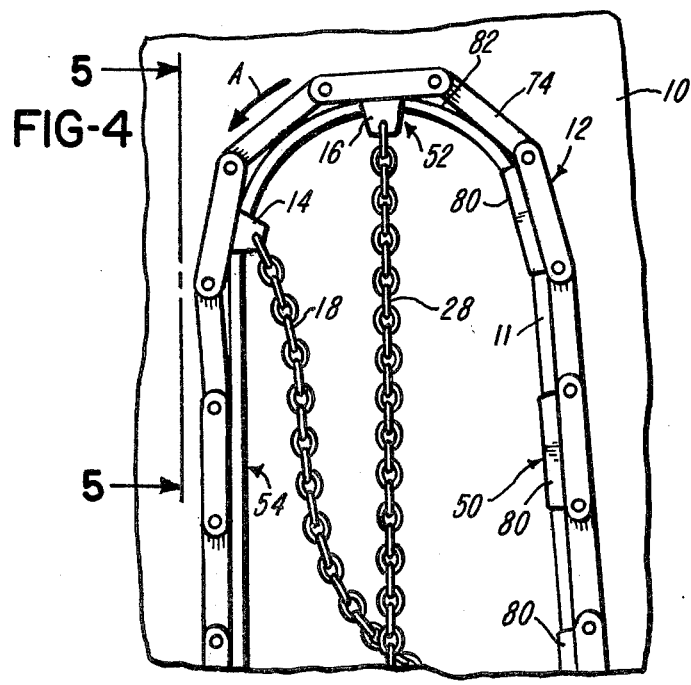

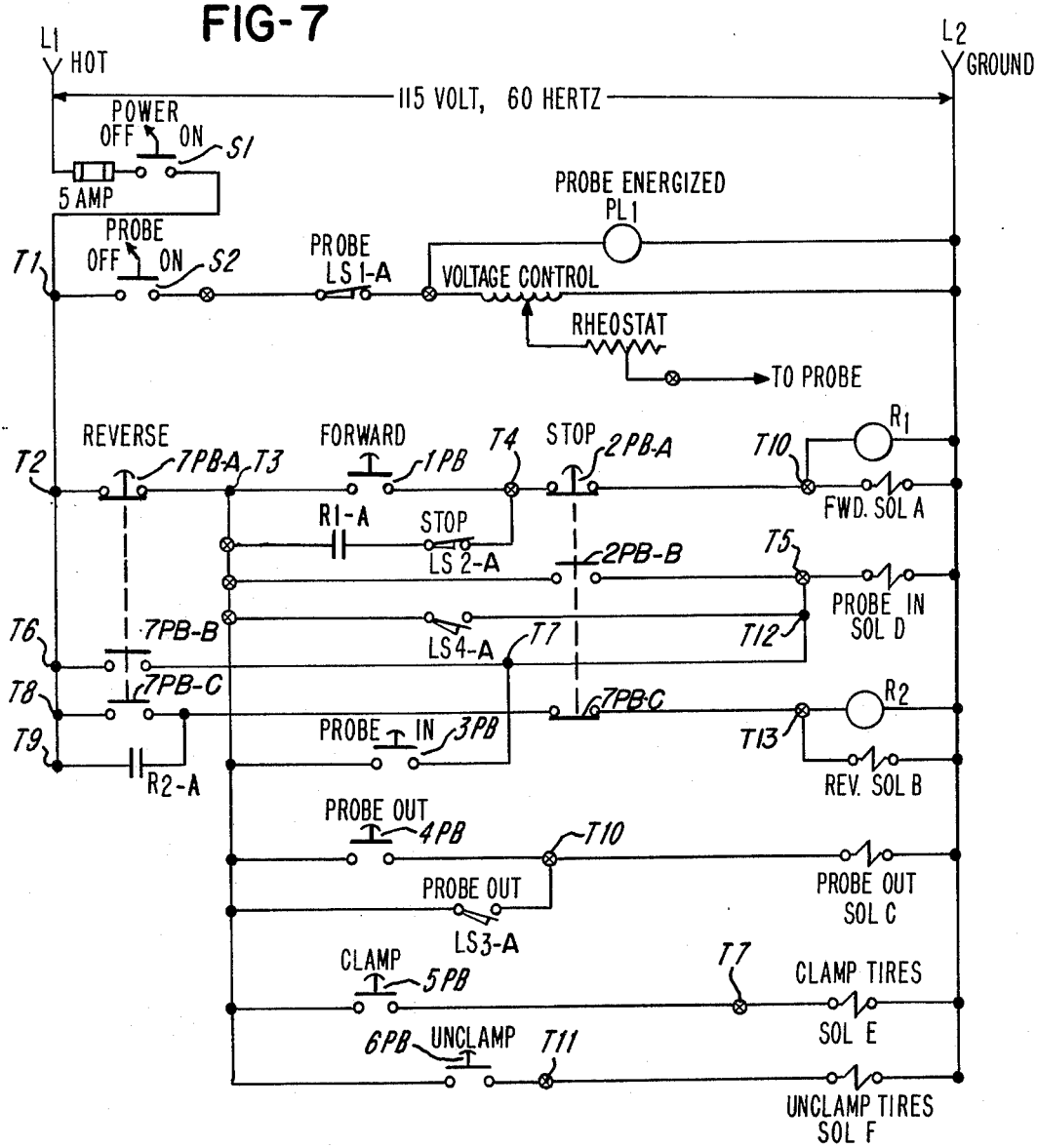

MEANS FOR HANDLING HIDES DURING AND AFTER HIDE-PULLING OPERATION

BACKGROUND OF THE INVENTION

1. Field of the Invention

The present invention is directed to a method and means for handling hides during and immediately after a hide-pulling operation.

2. Description of the Prior Art

U.S. Pat. No. 3,737,949 dicloses a hide puller which comprises a pair of closely moving surfaces between which the tail of a hind-leg-suspended, partially skinned carcass is introduced for progressively pulling hide from the hind legs, the shoulder portions, the forelegs and the head as the moving, hide pulling surfaces are lowered from a fully elevated to a fully lowered position during the hide pulling operation.

U.S. Pat. No. 3,479,686 discloses the use of an endless conveyor for advancing and imparting a hide-pulling force to a hide clamping device during a hide pulling operation.

SUMMARY OF THE INVENTION

The present invention is directed to a method and means for not only pulling hide from a hind-leg-suspended carcass, but also for handling the hide during and immediately after the hide pulling operation has been completed.

The loosened hide is initially and partially pulled from the carcass by means of a chain having a slip loop therein in which a flap of hide is securely, though releasably anchored. The hide thus pulled from the carcass is advanced and guided, by the chain, between a pair of laterally spaced, substantially cylindrical members which rotate about a horizontal axis in such a manner as to engage opposite surfaces of a hide introduced therebetween for exerting a pulling force on the hide sufficient to complete the hide pulling operation. During the entire, two step, hide-pulling operation the hide flap is securely anchored in the slip loop, so that elevation of the loop-defining chain will lift the pulled hide to an elevation sufficient for completely suspending the pulled hide above a conveyor, chute or other device onto or into which the hide is deposited for further processing.

A second chain is utilized for automatically releasing the slip loop from the hide flap as the first chain reaches the top of its pulled-hide-elevating travel and starts to descend from said elevated position.

Both chains are secured at one of their ends in spaced relationship to an endless conveyor which travels along a predetermined, closed path defined by a first descending portion disposed adjacent the hind-leg-suspended carcass; a first ascending portion disposed rearwardly of the first descending portion and of sufficient height to elevate the hide to a fully suspended position; a transition portion and a second descending portion for changing the direction of the conveyor for transfering tension from the first chain to the second chain to automatically release the slip loop and drop the hide therefrom; and a return portion for returning both of the chains to the first descending portion.

In the preferred embodiment, control means are provided for automatically stopping advancement of the conveyor and chains after the slip loop is released and the suspended hide is dropped, enabling an operator to secure the slip loop to the hide of a subsequent carcass which is to be stripped.

It is a primary object of the invention to provide a method of and means for handling hides during and immediately after a hide pulling operation, wherein the hide is pulled downwardly and stripped from a hind-leg suspended carcass, the pulled hide is lifted to an elevation sufficient for fully suspending the hide, and the suspended hide is dropped.

It is, further, an object of the invention to provide primary hide pulling means for imparting a downwardly, hide-pulling motion to a partially peeled animal hide, wherein the primary means advances and guides the pulled hide through a secondary hide pulling means, said primary means continuously engaging the hide during and after completion of both hide-pulling phases.

Other objects and features of the invention will be readily apparent from the accompanying drawings and description.

BRIEF DESCRIPTION OF THE DRAWINGS

FIG. 3 illustrates the slip loop, the pull chain and the release chain, enlarged for clarity of detail and understanding.

FIG. 4 is a fragmentary side view of the hide puller with a portion of the housing removed to expose the conveyor chain.

FIG. 5 is a view taken at line 5—5 of FIG. 4, enlarged for clarity of detail and understanding.

FIG. 6 illustrates means for mounting a stimulus probe adjacent the hide puller of FIG. 1.

FIG. 7 is a schematic diagram of exemplary circuitry for controlling the operation of the hide puller.

DESCRIPTION OF THE PREFERRED EMBODIMENTS

Figure 1:
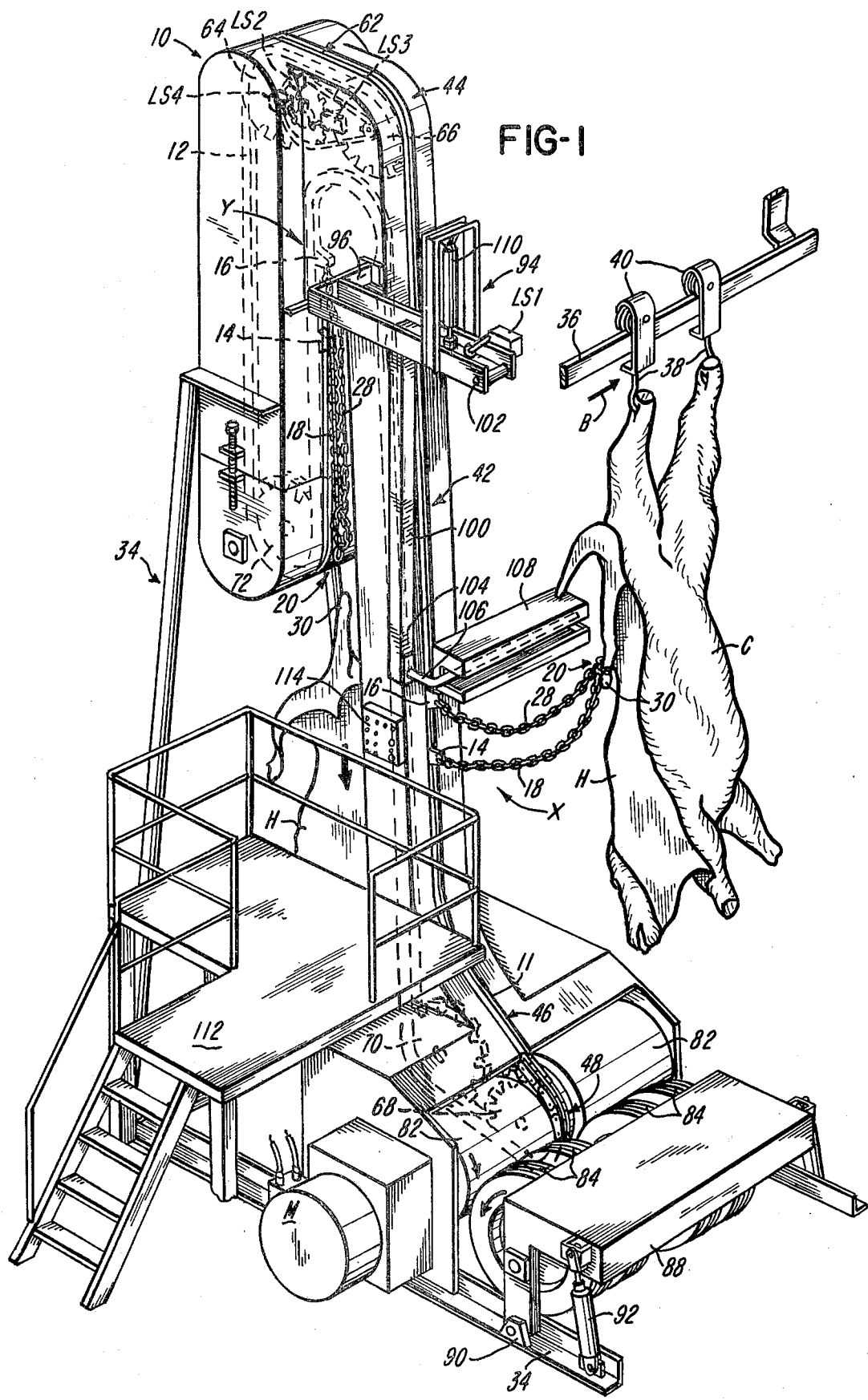
FIG. 1 is a perspective view of a hide puller incorporating the features of the subject invention.

The present invention includes primary and secondary hide pulling means for engaging and pulling a partially loosened hide H from a suspended carcass C. The primary means engages and advances the hide during and after both the primary and the secondary hide pulling phases of the operation. Means such as, by way of example, conveyor 12 (FIGS. 4 and 5) are provided for advancing the primary means to impart a downward hide pulling motion thereto, to introduce the partially pulled hide to and guide it through the secondary hide pulling means, to lift the pulled hide to an elevation sufficient for fully suspending the hide, and to release and drop the suspended hide. The primary hide pulling means comprises, in general, housing 10, conveyor 12, and chains 18 and 28. The secondary hide pulling means comprises a pair of rotatable cylinders such as drums 82 and tires 84 disposed adjacent housing 10. A stimulus probe 94 may, if desired, be mounted on (FIG. 1) or adjacent (FIG. 6) housing 10 for stimulating carcass C during a hide pulling operation. A control circuit for controlling the operation of the hide puller is illustrated in FIG. 7.

THE PRIMARY HIDE PULLING MEANS

Housing 10 includes guide means such as, by way of example, the through channel 11 (FIGS. 1 and 4) which defines a continuous track or path for an endless, flexible conveyor chain 12 (FIG. 5). A pair of spaced ears 14 and 16 are secured to and carried by chain 12 and project outwardly from the housing. One end of pull chain 18 is secured to ear 14, whereas one end of release chain 28 is secured to ear 16. The other end of pull chain 18 defines a slip-loop 20 for receiving and securely, though releasably, gripping flap 30 of the hide H of an animal carcass C which is suitably suspended, head down, from an elevated rail 36 adjacent housing 10.

Figure 2:
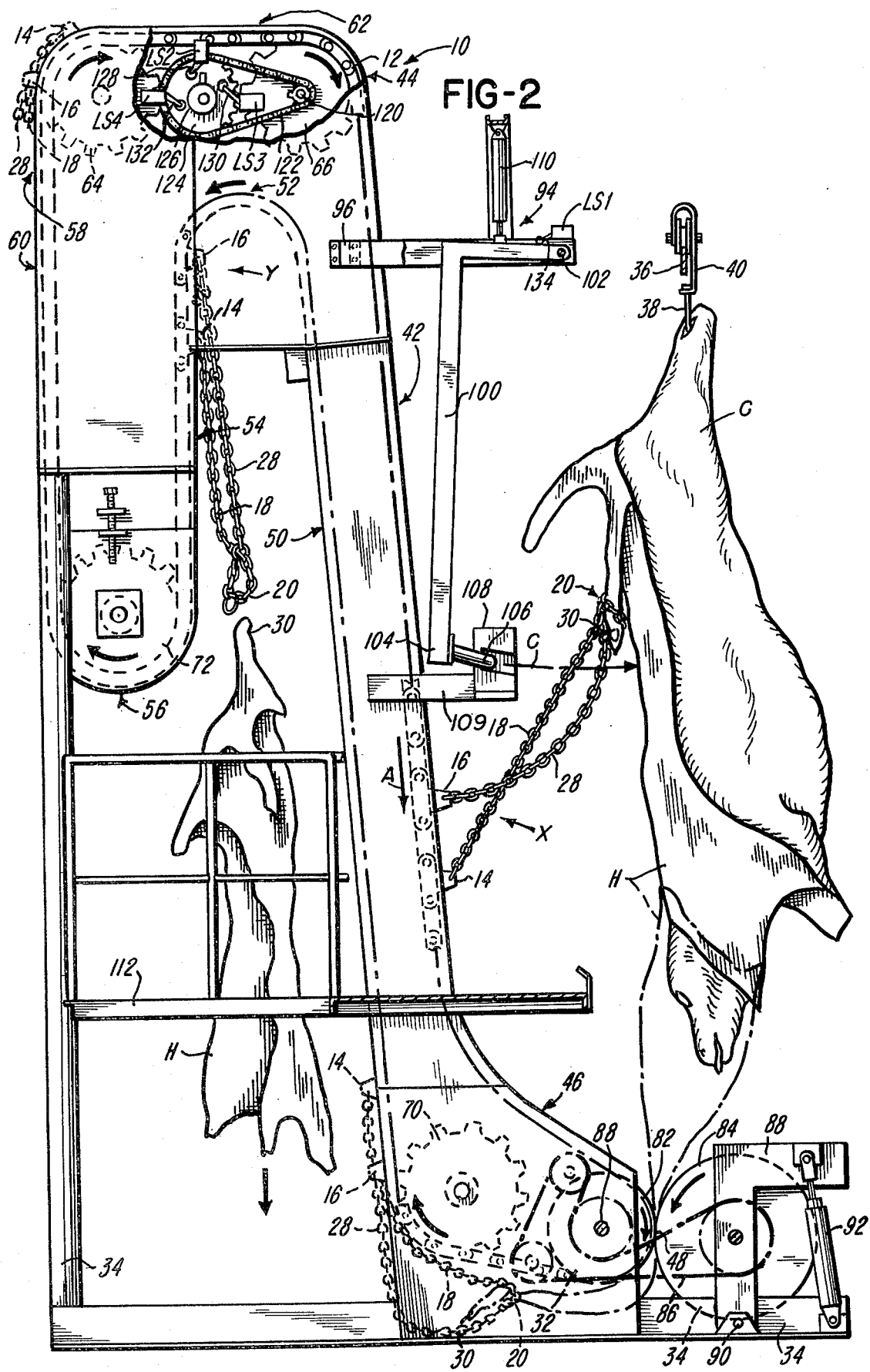
FIG. 2 is a side elevation view of the hide puller of FIG. 1.

The slip-loop is formed by passing chain 18 through ring 22 and passing ring 22 through the last link 24 of the chain (FIG. 3). A second ring 26 is passed through one of the links in chain 18 for precluding unlooping of the chain relative to ring 22. Ring 22 also passes through the last link 32 of release chain 28. As shown in FIG. 2, when flap 30 of the hide is inserted in loop 20 and chain 18 is in tension, loop 20 tightens about and grips flap 30. Conversely, loop 20 is loosened or relaxed by relaxing the tension in chain 18 and placing chain 28 in tension whereby flap 30 is released from the loop.

Conveyor track channel 11 extends about the periphery of the housing and conveyor chain 12 is disposed in channel 11 adjacent the interior walls 82 (FIG. 5) of the housing with ears 14 and 16 projecting downwardly therethrough (FIG. 4). The track includes a first downwardly descending reach 42 having an upper end 44 and a forwardly projecting lower end portion 46. The lowermost end 48 of end portion 46 is in substantial vertical alignment with the head of the suspended carcass C. The first ascending reach 50 of the track extends from the lowermost end 48 of reach 42 to a height sufficient for suspending hide H from loop 20 after it has been completely separated from carcass C. Transition portion 52 spans the space between the upper ends of first ascending reach 50 and a second descending reach 54. The lowermost end 56 of the second descending reach 54 is coupled to upper end 44 of the first descending reach 42 via a return reach 58 comprising an ascending portion 60 and a horizontal portion 62 which extends the length of the back and the top of housing 10, respectively. A plurality of sprocket gears 64, 66, 68, 70 and 72 are mounted for rotation in housing 10 and are adapted for receiving and guiding chain 12 along the conveyor track channel 11.

As shown in FIG. 5. the conveyor chain comprises a pair of side-by-side sprocket-engaging-chains 74, 76 having common link pins 78. Spacers such as ears 14 and 16 and slot-filler plates 80 are disposed between the sprocket-chains 74, 76 and maintain the chains in parallel, spaced relationship. The spacers are secured to the chains by pins 78. Each sprocket chain 74, 76 slidingly engages interior housing wall 82 adjacent channel 11, wherein the spacers are disposed in open communication with channel 11, and wherein ears 14 and 16 project outwardly therethrough (FIG. 4).

Channel filler plates 80 (FIG. 4) project into channel 11 and preclude the introduction of foreign material into the conveyor track. The channel filler plates are particularly useful in keeping the hide out of the track. It is therefore desireable that the filler plates be mounted in the conveyor chain in trailing relationship with ears 14 and 16.

When the conveyor is advanced in the direction of arrow A, (FIG. 2) chain 18 is placed in tension and flap 30 of the hide is retained by slip loop 20. A downward, hide pulling motion is imparted to chain 18 and slip loop 20 and hide H is pulled and stripped from carcass C.

The partially pulled hide is guided by chain 18 and slip loop 20 into the secondary hide pulling means as the conveyor advances ears 14 and 16 along descending reach 42 and thence upwardly in reach 50, see FIG. 2. In the preferred embodiment, chain 18 pulls and removes approximately one-half of the hide from the carcass before the hide is introduced into the secondary hide pulling means. After flap 30 has passed through the secondary pulling means, ears 14 and 16 of the conveyor chain advance upwardly in ascending reach 50 of the conveyor track, whereby the weight of the hide keeps chain 18 in tension, and maintains loop 20 in gripping relationship with flap 30 of the hide.

Chain 18 remains in tension as it advances through transition portion 52 of track 11. When ear 16 reaches the apex of transition portion 52, (FIG. 4) the tension is transferred from pull chain 18 to release chain 28. Loop 20 releases flap 30 of the hide and the hide drops as shown in FIGS. 1 and 2.

Conveyor chain 12 continues to advance downwardly in descending reach 54 of the track and thence along the ascending portion 60 and horizontal portion 62 of return reach 58 whereby pull chain 18 and release chain 28 are returned to the uppermost end 44 of the first descending reach 42, for subsequent hide-pulling operations. Where desired, a plurality of sets X and Y of ears 14, 16 and the pull chains 18 and release chains 28 associated therewith may be mounted in spaced relationship along chain 12, as shown in FIGS. 1 and 2. The plurality of sets of chains reduces the overall time required for each complete hide-pulling cycle, since one set X is in the hide-pulling phase while another set Y is in the hide-release phase.

In the preferred embodiment, housing 10 is mounted in a free standing support frame 34 and is positioned adjacent a section of overhead conveyor rail 36. The conveyor rail is adapted for selectively advancing a plurality of carcasses C in the direction of arrow B (FIG. 1). The carcasses are suspended from rail 36 by suitable means such as, by way of example, hooks 38 which are carried by and depend from a plurality of trolley hangers 40.

THE SECONDARY HIDE PULLING MEANS

As ears 14 and 16 advance downwardly in reach 42 of the conveyor path, pull chain 18 pulls hide H from the carcass and introduces the partially pulled hide to secondary hide pulling means such as, by way of example, the laterally spaced, rotatably cylinders 82, 84 disposed on parallel, horizontal axes adjacent and forwardly of the lowermost end 48 of reach 42.

In the preferred embodiment, cylinder 82 comprises drums having a rigid peripheral surface, whereas cylinder 84 comprises pneumatic tires of the like having a resilient peripheral surface. Tires 84 are rotatably mounted in frame 88 which is mounted at 90 for pivotal movement relative to frame 34 of the housing, whereby tires 84 are selectively advanced toward and retracted from drums 82. The piston and cylinder actuator 92 controls the position of tires 84 relative to drums 82 for controlling the pressure to which the hide H is subjected as it is fed therebetween.

Chain 18 pulls and removes approximately one-half of the hide and introduces the partially pulled hide between the rotating cylinders 82, 84. The cylinders then frictionally engage and advance the hide as shown in phantom in FIG. 2 for completely separating the hide from the carcass.

Preferably, conveyor chain 12 advances at a speed slightly less than the surface speed of the rotating cylinders, whereby the cylinders provide the hide pulling force while the hide is passing therebetween. It should, of course, be understood that conveyor chain 12 advances at a rate sufficient to maintain pull chain 18 in tension, whereby loop 20 continues to tightly hold hide H during the entire hide-pulling operation.

It will be noted that the hair-side of the hide is engaged by tires 84 and the flesh-side of the hide is engaged by drums 82 as the hide advances through the secondary hide pulling means.

The cylinders 82, 84 and conveyor chain 12 are conveniently driven by a single drive source such as, by way of example, electrohydraulic motor M. Belt assembly 86 (FIG. 2) and sprocket gear 68 are driven by shaft 88 of the motor, whereby drums 82, wheels 84 and chain 12 are driven in the well-known manner.

THE STIMULUS PROBE

Where desired, probe 94 may be utilized in combination with the hide-puller of the subject invention to electrically stimulate and stiffen the carcass C during the hide pulling operation. The stimulus probe may be mounted directly on housing 10 via support brackets 96, see FIG. 2, or may be a separate unit which is mounted in fixed relationship relative to housing 10 by means such as, by way of example, support members 98 secured to and depending from rail support F, see FIG. 6.

The elongate control arm 100 of the stimulus probe is mounted at 102 for pivotal movement relative to carcass C. The free lower end 104 of the control arm supports a projecting electrode 106 which is movable between an advanced, carcass engaging position and a retracted position, see arrow C (FIG. 2).

It is desirable to provide a protective, non-conductive guard 108 for receiving and shielding the electrode 106 when it is disposed in the retracted position. The guard may be mounted directly to housing 10 via support 109 as shown in FIG. 2, or may be part of the independent stimulus probe assembly as shown in FIG. 7.

Movement of the electrode 106 is controlled by the piston and cylinder actuator 110. After the pull chain 18 has pulled sufficient hide downwardly from the carcass to provide clearance for advancement of electrode 106 into direct contact with the bare carcass C, the piston and cylinder actuator is activated for actuating control arm 100 and advancing electrode 106 into carcass engagement position.

CONTROL CIRCUITRY AND ASSOCIATED APPARATUS

Platform 112 is secured to and carried by frame 34 and provides an elevated work station for placing an operator adjacent the suspended carcass C to facilitate attachment of loop 20 to flap 30 of the hide. In the preferred embodiment, control panel 114 is mounted on housing 10 adjacent platform 112, whereby the operator may control the entire operation from a single work station.

Uniformly satisfactorily results have been obtained when the hide-puller of the subject invention is controlled by the electrical circuit illustrated in FIG. 7 and the associated hardware such as, by way of example, limit switches LS1, LS2, LS3 and LS4 illustrated in FIG. 2. The various control switches, lamps, pushbuttons and the like for operating the control circuit are located at control panel 114.

Initially, one set X of chains 18 and 28 are in the position of FIG. 1, whereby an operator may place flap 30 of the hide in slip-loop 20. The power switch is then switched to the ON position to close contacts S1 and energize terminals T1, T2, T6, T8 and T9.

When probe 94 is utilized, the probe switch is switched to the ON position to close contacts S2 and energize the probe circuit. Initially, probe electrode 106 is in the retracted position, as shown in FIGS. 1, 2, and 6, and control arm 134 of limit switch LS1 is engaged and depressed by probe arm 100. The normally closed contacts LS1-A of limit switch LS1 are opened and probe light PL1 and the probe voltage control are de-energized.

It will be noted that the reverse pushbutton contacts 7PB-A are normally closed between terminals T2 and T3, whereby terminal T3 is energized. The clamp pushbutton is depressed to close contacts 5PB and energize solenoid E, for actuating advancement of the piston out of the cylinder of actuator 92 for advancing tires 84 into hide-engaging position relative to drums 82. When the clamp pushbutton is released, contacts 5PB are opened and solenoid E is is de-energized. It should, however, be understood that the tires remain in hide-engaging position until the unclamp pushbutton is depressed to close contacts 6PB and energize solenoid F for actuating retraction of the piston into the cylinder of actuator 92.

Once the tires and drums are disposed in hide-engaging position, flap 30 is placed in loop 20 of the pulling chain and the forward pushbutton is depressed to momentarily close contacts 1PB between terminals T3 and T4. It will be noted the stop pushbutton contacts 2PB-A between terminals T4 and T10 are normally closed, therefore, depression of the forward pushbutton energizes forward solenoid A and control relay R1. This actuates rotation of the shaft 88 of motor M in the forward direction for advancing conveyor chain 12 in the direction of arrow A, see FIG. 2, and for rotating drums 82 and tires 84 in the hide-pulling direction.

Energization of control relay R1 closes the normally open contacts R1-A between terminals T3 and T4, whereby forward solenoid A remains energized after the forward pushbutton is released and contacts 1PB are opened. It should, of course, be understood that motor M is actuated in the forward direction only while solenoid A is energized.

A plurality of limit switches LS2, LS3 and LS4 are located in housing 10 (FIGS. 1 and 2) and are disposed in a cluster about cam 126. Cam 126 rotates with sprocket gear 124 which is driven by belt or chain drive 122 and gear 120. Gear 120 rotates with sprocket gear 66 is response to movement of conveyor chain 12 in track 11. The ratio of gears 66, 120 and 124 is such that cam 126 makes one complete revolution for each cycle of operation. Limit switch LS2 controls solenoid A, whereas limit switches LS3 and LS4 control solenoids C and D, respectively, for extending and retracting probe electrode 106 relative to the carcass C.

Once forward solenoid A is energized, it remains energized until the control arm 128 of limit switch LS2 is engaged and depressed by cam 126 for activating and opening the normally closed contacts LS2-A between terminals T3 and T4. The conveyor chain 12 advances forwardly in channel 11 and introduces hide H between drums 82 and tires 84, as shown in phantom in FIG. 2. When sufficient hide has been removed to expose the bare carcass to the probe electrode 106, cam 126 engages and depresses control arm 130 and activates limit switch LS3 to close the normally open contacts LS3-A between terminals T3 and T10 and energize probe-out solenoid C. This actuates advancement of the piston out of the cylinder of actuator 110 and pivots probe arm 100 for advancing electrode 106 into the extended, carcass-engaging position. Solenoid C is de-energized after cam 126 rotates beyond and releases control arm 130 of limit switch LS3. It should, however, be understood that electrode 106 remains in the extended, carcass-engaging position until probe-in solenoid D is energized. It should also, of course, be understood that actuation of the probe arm 100 and electrode 106 to the carcass-engaging position releases control arm 134 of limit switch LS1 and closes the contacts LS1-A thereof for energizing the probe voltage control to supply power to the probe electrode. Probe light PL1 is illuminated whenever the probe voltage control is energized.

By the time the hide is completely removed from the carcass, cam 126 has rotated to engage and depress control arm 132 and activate the limit switch LSA for closing the normally open contacts, LS4-A between terminals T3 and T12 for energizing probe-in solenoid D. This actuates retraction of the piston into the cylinder of actuator 110 and retracts probe electrode 106 into guard 108.

Conveyor chain 12 continues to advance in the direction of arrow A until ear 16 thereof reaches the apex of track transition portion 52 (FIG. 4), whereby release chain 28 is tightened and pull chain 18 is relaxed for enlarging loop 20 and releasing flap 30 of hide H, as shown in FIG. 2. When chains 18 and 28 reach the approximate position of sets X and Y in FIG. 1, cam 126 engages and depresses control arm 118 of limit switch LS2, opening the contacts LS2-A between terminals T3 and T4 for de-energizing forward solenoid A and control relay R1. When forward solenoid A is de-energized, motor M stops and conveyor chain 12 stops with the chains 18 and 28 in position for attaching loop 20 to flap 30 of an animal hide. Depression of the forward pushbutton, closes contacts 1PB and initiates a subsequent hide-pulling cycle.

It will be noted that depression of the stop pushbutton opens contacts ZPB-A and stops forward advancement of conveyor chain 12 by de-energizing the forward solenoid A. Further, contacts 2PB-B between terminals T3 and T5 are closed and solenoid D, is is energized for retracting probe electrode 106 into guard 108 whenever the cycle is stopped.

Depression of the reverse pushbutton opens contacts 7PB-A and also stops forward advancement of conveyor chain 12 by de-energizing solenoid A. Contacts 7PB-B are opened to retract probe electrode 106 into guard 108 by energizing solenoid D, and contacts 7PB-C are closed to energize reverse solenoid B and control relay R2. This actuates motor M in the reverse direction for reversing the direction of movement of conveyor chain 12 in track 11, slackening chains 18 and 28 and rotating drums 82 and tires 84 in the reverse direction to back hide H out of the space therebetween. Normally open contacts R2-A are closed when contact relay R2 is energized, whereby the motor continues to rotate, in the reverse direction after the reverse pushbutton is released and contacts 7PB-C are opened. It will be noted that the stop pushbutton includes contacts 2PB-C between terminals T8 and T13 which are opened whenever the stop pushbutton is depressed to de-energize reverse solenoid B. It will also be noted that depression of the probe-in pushbutton closes contacts 3PB between terminals T3 and T7, and energizes solenoid D to retract probe electrode 106 into guard 108, without respect to position of cam 126, whereas depression of the probe-out pushbutton closes contacts 4PB between terminals T3 and T10 and energizes solenoid C to extend probe electrode 106, without respect to the position of cam 126.

What is claimed is:
1. A device for advancing a hide during a hide pulling operation, and thereafter lifting and releasing the pulled hide, which comprises
   a pair of chains, one of which terminates in a hide-receptive slip loop and the other of which is secured to the slip loop and is operable to loosen same for releasing a hide engaged thereby; and
   means for advancing said chains along a predetermined, closed path downwardly during the hide-pulling operation, thence upwardly for elevating the pulled hide to a position sufficient for freely suspending the hide and for thereafter actuating the other of said chains to loosen the slip loop and release the suspended hide.
2. A device as called for in claim 1, wherein:
   the slip loop is defined by a ring and said one chain passing through the ring with one end thereof secured to the ring; and
   said other chain has one end secured to the ring for shifting said ring along said one chain to loosen the slip loop.
3. A device as called for in claim 2, which includes a second ring secured to the loop-defining portion of the said one chain adjacent said one end thereof for maintaining the slip loop incident to shifting of the first mentioned ring along said one chain.
4. A device as called for in claim 2, wherein the slip loop is maintained in hide retaining condition when the said one chain is in tension and is released from hide retaining condition when the said other chain is in tension.
5. A device as called for in claim 4, which includes means for selectively transferring the tension from the said one chain to the said other chain.
6. A device as called for in claim 4, wherein the means for advancing said chains includes an endless conveyor which travels along a predetermined path defining a closed loop, wherein both of said chains are secured at their other ends in spaced relationship to the conveyor, and wherein the tension in said chains is a function of change in direction of the conveyor as it moves along the predetermined path.
7. A device as called for in claim 6, which includes a plurality of sets of said chains secured in spaced relationship to and movable with said conveyor, wherein the one chain of one set is in tension when the other chain of another set is in tension.
8. A device as called for in claim 6, which includes control means for automatically stopping movement of the endless conveyor after the tension is transferred from the said one chain to the said other chain.
9. A device as called for in claim 6, wherein said conveyor imparts a hide-pulling motion to the said one chain when the said other chain is in tension.
10. A device as called for in claim 6, wherein said predetermined path includes:
    a first descending reach adjacent a hind-leg suspended carcass for placing the said one chain in tension and for imparting a downward, hide pulling motion thereto;

a first ascending reach spaced rearwardly of the first descending reach for imparting an upward, hide-lifting motion to the said one chain;

a transition portion and a second descending reach changing the direction of the conveyor for transferring the tension from the said one chain to the said other chain for dropping the suspended carcass; and a return reach for returning the said chains to the first descending reach.

11. An apparatus for pulling the partially peeled hide from a carcass, and for advancing, lifting and then releasing the pulled hide, comprising:

a primry hide puller engaging the hide during and after the hide pulling operation for imparting a downward, hide pulling motion to the hide, for lifting the pulled hide to an elevation sufficient for freely suspending the hide, and for thereafter dropping the suspended hide; and a secondary hide puller disposed adjacent the lower extreme of the downward, hide-pulling motion for engaging and imparting an additional hide pulling motion to the hide while said hide is engaged and advanced by the primary hide puller.

12. An apparatus as called for in claim 11, wherein said primary hide puller includes a pull chain for engaging, guiding and advancing the hide through the seconary hide puller.

13. An apparatus as called for in claim 12, wherein said secondary hide puller comprises a pair of parallel, rotating cylinders having peripheral surfaces adapted for frictionally engaging and imparting a hide pulling motion to the hide as it is guided and advanced therebetween by said pull chain.

14. An apparatus as called for in claim 13, wherein the peripheral surface of one of said cylinders is rigid and the peripheral surface of the other of said cylinders is resilient, and wherein the primary puller introduces a flesh side of the hide to the rigid surface and a hair side of the hide to the resilient surface, respectively.

15. An apparatus as called for in claim 13, wherein the hide engaging surfaces of said rotating cylinders advance the hide at a velocity greater than the velocity of the advancing pull chain.

16. An apparatus as called for in claim 13, wherein the rotating cylinders are adapted for lateral movement relative to one another for increasing the hide engaging force therebetween.

17. An apparatus as called for in claim 12, wherein one end of said pull chain terminates in a hide-engaging slip loop for securely, though releasably, engaging said hide, and wherein said primary hide puller includes a release chain having one end secured to and adapted for loosening a slip loop and releasing a hide engaged thereby.

18. An apparatus as called for in claim 17, wherein the slip loop is maintained in hide retaining condition when the pull chain is in tension and is released from hide retaining condition when the release chain is in tension.

19. An apparatus as called for in claim 18, wherein the pull chain is in tension during and after the hide is advanced through the secondary hide puller.

20. An apparatus as called for in claim 18, wherein said primary hide puller includes an endless conveyor which travels along a predetermined, closed path, wherein both of said chains are secured at their other ends in spaced relationship to the conveyor, and wherein the tension in said chains is a function of a change in the direction of the conveyor as it moves along the predetermined path.

* * * * *